US006292184B1

(12) United States Patent
Morgan

(10) Patent No.: US 6,292,184 B1
(45) Date of Patent: *Sep. 18, 2001

(54) MULTIMEDIA USER INTERFACE EMPLOYING COMPONENTS OF COLOR TO INDICATE THE VALUES OF VARIABLES

(75) Inventor: Oliver F. Morgan, San Jose, CA (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/982,838

(22) Filed: Dec. 2, 1997

Related U.S. Application Data

(63) Continuation of application No. 08/388,694, filed on Feb. 15, 1995, now Pat. No. 5,838,938.

(51) Int. Cl.[7] .......................................... G06F 3/14
(52) U.S. Cl. ......................... 345/328; 345/339; 345/348; 345/970; 345/431
(58) Field of Search ................................. 345/431, 432, 345/327, 328, 339, 348, 349, 302, 440, 970; 364/188

(56) References Cited

U.S. PATENT DOCUMENTS

| Re. 32,632 | 3/1988 | Atkinson ............................. 345/191 |
|---|---|---|
| 4,352,105 | 9/1982 | Harney ................................. 345/150 |
| 4,533,910 | 8/1985 | Sulonick et al. ..................... 73/54.14 |
| 4,555,775 | 11/1985 | Pike ...................................... 345/344 |
| 4,622,545 | 11/1986 | Atkinson ............................. 345/191 |
| 4,748,618 | 5/1988 | Brown et al. ........................ 370/419 |
| 4,772,882 | 9/1988 | Mical ................................... 345/146 |

(List continued on next page.)

FOREIGN PATENT DOCUMENTS 0 239 884 A1    8/1994   (EP) .

OTHER PUBLICATIONS

Ellen D. Hoadley, "*Investigating the Effects of Color*", Feb. 1990, Association for Computing Machinery Inc., pp. 1–10.

Chulhee Lee and David A. Landgrebe, "*Analyzing High–Dimensional Multispectral Data*", IEEE Transactions on Geoscience and Remote Sensing, 7/93, vol. 31, n.4, pp. 792–800.

(List continued on next page.)

*Primary Examiner*—Raymond J. Bayerl
*Assistant Examiner*—Thomas T. Nguyen
(74) *Attorney, Agent, or Firm*—Blakely, Sokoloff, Taylor & Zafman LLP

(57) ABSTRACT

The present invention provides apparatus and methods for use in computer display systems, and in particular, a graphical user interface for use in computer controlled multi-media editing systems. The user interface of the present invention utilizes the three components of color, hue, luminance and saturation, to convey information to a user. In a preferred embodiment, each of the three components are mapped to variables that are displayed on the interface. The value of a particular variable may be represented by a gradient of one of the color components or by a discrete value of one of the color components.

26 Claims, 13 Drawing Sheets

(6 of 13 Drawing Sheet(s) Filed in Color)

U.S. PATENT DOCUMENTS

| Patent No. | Date | Inventor | Class |
|---|---|---|---|
| 4,785,408 | 11/1988 | Britton et al. | 84/239 |
| 4,788,538 | 11/1988 | Klein et al. | 345/418 |
| 4,812,834 | 3/1989 | Wells | 345/340 |
| 4,847,604 | 7/1989 | Doyle | 345/180 |
| 4,873,623 | 10/1989 | Lane et al. | 700/83 |
| 4,884,223 | 11/1989 | Ingle et al. | 702/41 |
| 4,899,136 | 2/1990 | Beard et al. | 345/156 |
| 4,914,732 | 4/1990 | Henderson et al. | 340/825.17 |
| 4,931,783 | 6/1990 | Atkinson | 345/163 |
| 4,935,865 | 6/1990 | Rowe et al. | 700/83 |
| 4,939,507 | 7/1990 | Beard et al. | 345/156 |
| 5,008,853 | 4/1991 | Bly et al. | 345/331 |
| 5,036,315 | 7/1991 | Gurley | 345/340 |
| 5,062,060 | 10/1991 | Kolnick | 345/339 |
| 5,072,412 | 12/1991 | Henderson, Jr. et al. | 345/346 |
| 5,155,806 | 10/1992 | Hoeber et al. | 345/338 |
| 5,157,768 | 10/1992 | Hoeber et al. | 345/338 |
| 5,218,672 | 6/1993 | Morgan et al. | 345/501 |
| 5,228,119 | 7/1993 | Mihalisin et al. | 345/418 |
| 5,237,648 | 8/1993 | Mills et al. | 345/433 |
| 5,261,041 | 11/1993 | Susman | 345/473 |
| 5,339,393 | 8/1994 | Duffy et al. | 345/328 |
| 5,359,712 | 10/1994 | Cohen et al. | 345/328 |
| 5,386,581 * | 1/1995 | Suzuki et al. | 364/225.8 |
| 5,454,068 * | 9/1995 | Ramanujam | 345/419 |
| 5,499,368 | 3/1996 | Tat et al. | 707/4 |
| 5,540,232 | 7/1996 | Laney et al. | 600/510 |
| 5,559,754 | 9/1996 | Carnaggio et al. | 367/15 |
| 5,577,190 * | 11/1996 | Peters | 345/501 |
| 5,586,216 | 12/1996 | Degen et al. | 702/76 |
| 5,610,825 | 3/1997 | Johnson et al. | 702/76 |
| 5,650,942 * | 7/1997 | Granger | 345/154 |
| 5,781,188 * | 7/1998 | Amiot et al. | 345/328 |
| 5,867,169 * | 2/1999 | Prater | 345/431 |
| 5,892,506 * | 4/1999 | Hertmanson | 345/302 |

OTHER PUBLICATIONS

Michael Alexander, "*Visualizing Cleared–Off Desktops*", May 6, 1991, p. 20.

Hiroshi Ishii and Kazuho Arita, "*Clearface: Tanslucent Multiuser Interface for TeamWorkStation*", Sep. 1991.

Hiroshi Ishii and Naomi Miyaki, "*Toward an Open Shared Workspace: Computer and Video Fusion Approach of Team-WorkStation*", Dec. 1991, vol. 34, No. 12, pp. 39–50.

Patrick P. Chan, "*Learning Considerations in User interface Design: The Room Model*", Software Portability Laboratory, Dept. of Computer Science, University of Waterloo, Waterloo, Ontario, Canada, Jul. 1984, CS–94–16.

IBM Technical Disclosure Bulletin: "*Creation/Modification of the Audio Signal Processor Setup for a PC Audio Editor*", vol. 30, No. 10, Mar. 1988, pp. 367–376.

Stravos Christodoulakis and Stephan Graham, "*Browsing Within Time–Driven Multimedia Documents*", Conference on Office Information Systems, Mar. 23–25,1988, ACM #611880, pp. 219–227.

Hirotada Ueda, Takafumi Miyatake and Satoshi Yoshizawa," *Impact: An Interactive Natural–Motion Picture Dedicated Multimedia Authoring System*", Communications of the ACM, Mar. 1991, pp. 343–350.

Erick, et al., "*Seesoft—A Tool for Visualizing Line Oriented Software Statistics*", IEEE Transactions on Software Engineering, v18, n11, pp. 957–968, 11/92.

Oberg, "*Error Reporting with Graduated Color*", IEEE Software, v9, n6, 11/92, pp. 33–38.

Hussaini, "*Simple Bar Graph Display for Control Variables and Alarm Status*", Electro/94 International Conference Proceedings, 1994, pp. 651–656.

* cited by examiner

MULTIMEDIA USER INTERFACE EMPLOYING COMPONENTS OF COLOR TO INDICATE THE VALUES OF VARIABLES

The present application is a Continuation Application of pending U.S. application Ser. No. 08/388,694 which was filed Feb. 15, 1995, U.S. Pat. No. 5,838,938.

BACKGROUND OF THE INVENTION

1. Field of the Invention

The present invention relates to apparatus and methods for displaying graphic information, and more particularly, the present invention relates to a computer controlled display system for editing a multi-media production.

2. Art Background

Over the past decade, a variety of graphic user interfaces have been developed to ease human interaction with computer systems. Many display systems utilize metaphors in the design of the interface as a way of maximizing human familiarity, and conveying information between the user and the computer. It is common for computer systems incorporating so-called "object oriented" display systems to utilize multiple "windows" on a display in which combinations of text and graphics are disposed. The display systems utilize familiar metaphors, such as desktops, control panels, notebooks and the like, such that the interface takes advantage of existing human mental structures to permit a user to draw upon the metaphor analogy to understand the requirements of the particular computer system.

It is well known that designing around a familiar metaphor helps reduce human learning time. (See for example, Patrick Chan, "Learning Considerations in User Interface Design: The Room Model", Report CS-84-16, University of Waterloo Computer Science Department, Ontario, Canada, July, 1984, and the references cited therein.) The ability to operate on images or objects which relate the user to actual objects on, for example, a desktop, results in a stronger man-machine interface. (See for example, D. Robson, "Object Oriented Software Systems", BYTE, August 1991, page 74, Vol. 6, No. 8; L. Tesler, "The Smalltalk Environment", BYTE, August 1981, page 90, Vol. 6, No. 8; and Smith, et al., "Star User Interface: An Overview", National Computer Conference, 1982. A number of these interfaces have received patent protection over the past ten years (See for example, J. Blatt, "A Primer on User Interface Software Patents"; The Computer Lawyer, April 1992, Page 1, Vol. 9, No. 4).

Research in interface design using metaphors in man-machine interfaces may be applied to computer controlled editing systems to incorporate and integrate various production media resources, such as special effects, music, graphics and the like. In the case of an editing system, a variety of resources must be integrated, scheduled and coordinated with one another to obtain a complete multi-media product. Users of computer controlled editing systems are generally familiar with the individual resources and the coordination of those resources to develop a finished product. Accordingly, the "windows" utilized in a video editing system may be designed such that the metaphor of the interface takes advantage of the knowledge of the user in operating discrete devices (for example, a video tape recorder or music synthesizer). The window may, therefore, take the form of a control panel for the video tape recorder, which includes the controls of play, reverse, record and the like. Similarly, the window may provide an area on the display screen in which movies, takes, or particular scenes are displayed for the user to edit.

A computer controlled editing system may allow a user of the system to integrate source material from a variety of multi-media resources to generate an output sequence. One problem associated with computer editing systems is that the editing systems often fail to provide the user an organized and visual display of the source material available to create the output sequence. The source material is associated with a variety of variables, including time, speed and type of source. The user may find it very difficult to assimilate all of these different variables without an interface that provides an effective mechanism for conveying the values of these variables. As will be described, the present invention provides a user interface that effectively displays these variables so that a user may more easily manipulate the source material.

The problem of conveying the values of variables to a user is not unique to multi-media editors. Computer games, databases, communications and control programs and any number of other programs convey the values of a wide variety of variables.

As will be described, the present invention provides an interface that allows the users of these programs to quickly and easily determine the approximate or exact value of these variables.

SUMMARY OF THE INVENTION

The present invention provides apparatus and methods for use in computer display systems, and in particular, a graphical user interface for use in computer controlled multi-media editing systems. A display system including at least one central processing unit (CPU) is coupled through appropriate input/output (I/O) circuitry to input devices, such as a cursor control device. The CPU is further coupled to a storage device for the storage of data and programs including a database. The CPU is also coupled to a display device on which the present invention's user interface is displayed.

The computer controlled editing system of the present invention utilizes the three components of color, hue, luminance and saturation, to convey information to a user. In a preferred embodiment, each of the three components are mapped to variables that are displayed on the interface. The value of a particular variable may be represented by a gradient of one of the color components or a discrete value of one of the color components.

The user interface of the present invention may be used in conjunction with a multi-media editing system. A source log containing video or audio information is represented on the interface by a timeline. In a preferred embodiment, the timelines vary according to lightness such that the relative lightness of a particular point on the timeline indicates the relative time of the underlying source material at that point. Different hues represent different source materials and saturation is used to represent whether a particular block of a timeline has been selected by the user for editing.

More generally, the present invention may be used in conjunction with any program that displays variables. As an example, a multi-media game configured according to the user interface of the present invention is described.

BRIEF DESCRIPTION OF THE DRAWINGS

The objects features and advantages of the present invention will be apparent from the following detailed description of the preferred embodiment of the invention with references to the drawings in which.

The file of this patent contains at least one drawing executed in color. Copies of this patent with color drawings will be provided by the Patent and Trademark Office upon request and payment of the necessary fee.

Notation and Nomenclature

Figure 1:
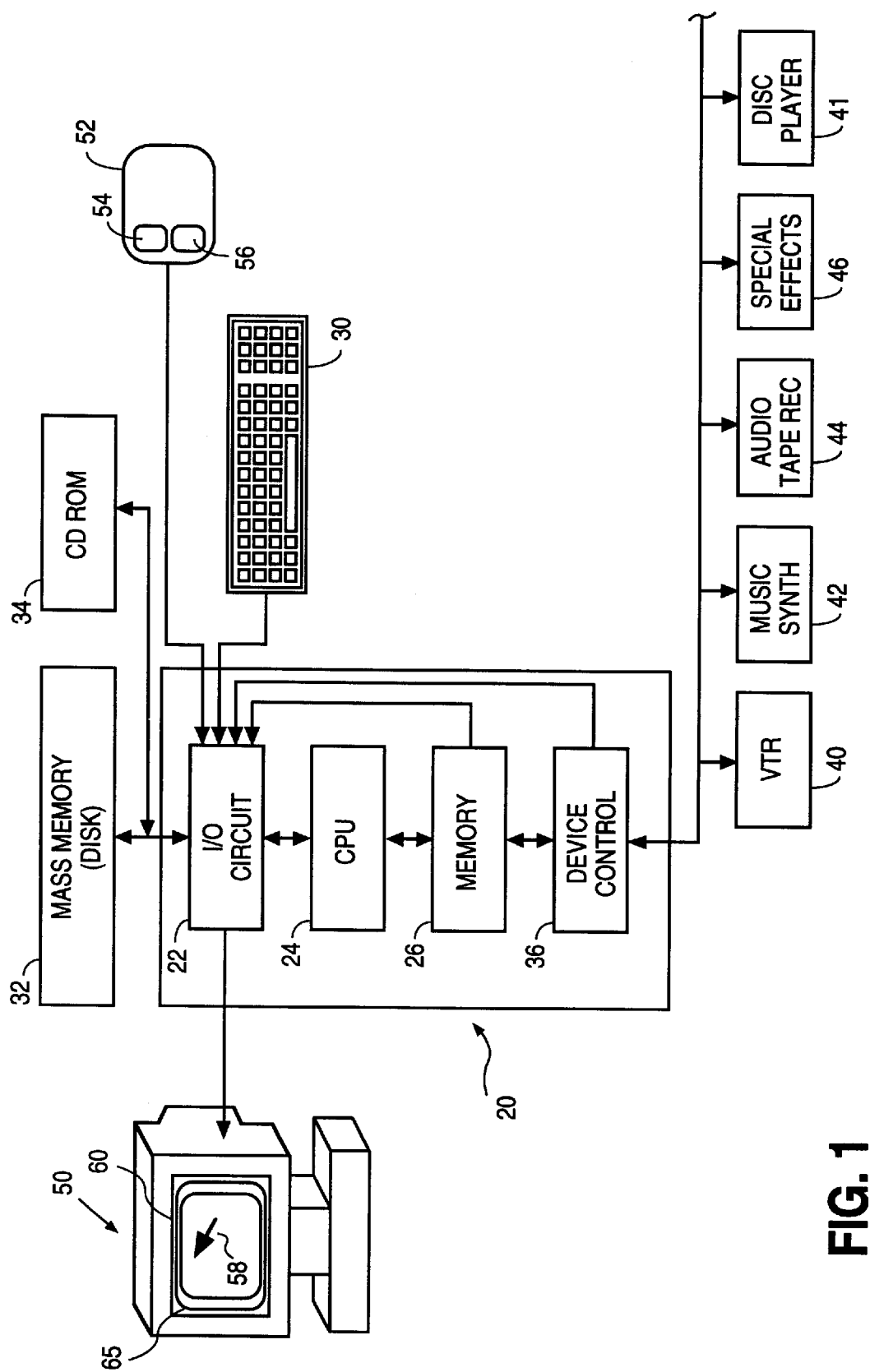
FIG. 1 is a functional block diagram illustrating one possible computer display system incorporating the teachings of the present invention.

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below. Machines which may perform the functions of the present invention include those manufactured by Sony Corporation, as well as other manufacturers of computer systems.

DETAILED DESCRIPTION OF THE INVENTION

The present invention discloses apparatus and methods for an improved user interface for a computer display. In the following description, numerous specific details are set forth such as timelines, icons, windows, etc. in order to provide a through understanding of the present invention. However, it will be apparent to one skilled in the art that the present invention may be practiced without these specific details. In other instances, well known circuits, structures and the like are not described in detail so as not to obscure the present invention unnecessarily. FIGS. 8–13 are color slides that illustrate examples of the use of color components, in accordance with the teachings of the teachings of the present invention.

Referring to FIG. 1, the hardware configuration of the present invention is conceptually illustrated. FIG. 1 illustrates a computer editing system for generating a window-based graphic user interface in accordance with the teachings of the present invention. As illustrated, the computer editing system includes a computer 20 which comprises four major components. The first of these is an input/output (I/O) circuit 22, which is used to communicate information in appropriately structured form to and from other portions of the computer 20. In addition, computer 20 includes a central processing unit (CPU) 24 coupled to the I/O circuit 22 and to a memory 26. These elements are those typically found in most computers and, in fact, computer 20 is intended to be representative of a broad category of data processing devices.

Also shown in FIG. 1 is a keyboard 30 for inputting data and commands into computer 20 through the I/O circuit 22, as is well known. Similarly, a CD ROM 34 is coupled to the I/O circuit 22 for providing additional programming capacity to the system illustrated in FIG. 1. It will be appreciated that additional devices may be coupled to the computer 20 for storing data, such as magnetic tape drives, buffer memory devices, and the like. A device control 36 is coupled to both the memory 26 and the I/O circuit 22, to permit the computer 20 to communicate with multi-media system resources. The device control 36 controls operation of the multi-media resources to interface the multi-media resources to the computer 20. For example, in a video editing environment, the computer 20 may be coupled through the device control 36 to a video tape recorder 40, a music synthesizer 42, an audio tape recorder 44, a special effects resource 46, and a disc player 41 as shown. The device control 36 may comprise an independent control and interface device or a software process for execution by the CPU 24.

A display monitor 50 is coupled to the computer 20 through the I/O circuit 22. In the preferred embodiment, the display monitor 50 will comprise a high resolution color display with 16 or more bits of color per pixel, but the display monitor 50 may also comprise an 8 bit color display. A cursor control device 52 includes switches 54 and 56 for signalling the CPU 24 in accordance with the teachings of the present invention. Cursor control device 52 (commonly referred to a "mouse") permits a user to select various command modes, modify graphic data, and input other data utilizing switches 56 and 54. More particularly, the cursor control device 52 permits a user to selectively position a cursor 58 at any desired location on a display screen 60 of the display 50. As illustrated in FIG. 1, the cursor 58 is disposed with a window 65 in the present invention's graphic user interface, to be described more fully below. Moreover, in the presently preferred embodiment, the present invention's window-based user interface is generated and displayed using software stored in either memories 26, 32 or CD ROM 34, and executed by the CPU 24.

In the presently preferred embodiment, the cursor control 52 utilizes well known apparatus and methods for signaling CPU 24 of position changes of cursor 58 by movement of the cursor control over a surface. However, it will be appreciated by one skilled in the art that a variety of well known cursor control devices may be utilized by the present invention, including other control devices such as mechanical mice, trackballs, joy sticks, graphic tablets, other keyboard inputs and the like. The cursor control 52 in FIG. 1 is intended to encompass all such equivalent devices.

According to one embodiment, the graphical user interface of present invention displays information for reediting which is associated with a database. Typically, the database is generated from a computer controlled editing system to incorporate and integrate various production media resources. As an example, a computer controlled editing system configured in accordance with the present invention may provide a means for a user of the computer controlled editing system to generate source logs. The database comprises a plurality of source logs which are pointers to selected portions of audio and/or video source material located on various media resources. Each source log comprises information such as a tape identifier, a start point, an end point, and any other information useful for the editing and re-editing processes. The database also contains a total duration for each source log. Through use of the source logs, the computer editing system controls the various media resources to provide source material for editing or reediting of a production. For example, to create a source log, a user may select a media resource, such as a video tape player, and command the computer controlled editing system to capture a selected portion of the video generated by the video tape player.

The source log generated may comprise video and/or any number of audio channels. The plurality of source logs generated for editing of a particular multi-media production may be arranged into a file such that the file contains source logs for the editing or re-editing of that particular production. As will be described more fully below, one embodiment of the graphical user interface of the present invention operates in conjunction with the database comprising the source logs. Although one embodiment of the present invention is described in conjunction with a computer controlled editing system that generates source logs, any database comprising source material for use in a computer controlled editing system could be used in accordance with the teachings of the present invention.

In a preferred embodiment, the computer editing system of the present invention retrieves the source logs stored in the database during an earlier edit session, and displays a corresponding source material block. Each source block contains a start point and an end point. The start and the end points define the available source material for the particular source block. To generate an output sequence, the source blocks are entered onto a timeline in a sequential order. However, in generating the output sequence, it may be desirable to include only a portion of the available source material from a particular source block. Therefore, the computer editing system permits selection of portions of any particular source block. The beginning of the selected portion of the source block is defined as the "in" or "head" point, and the closing of the selected portion of the source block is defined as the "out" or "tail" point. A final output sequence generated on the timeline comprises selected portions arranged such that a tail of a first source block is adjacent to a head of a subsequent source block.

Figure 2:
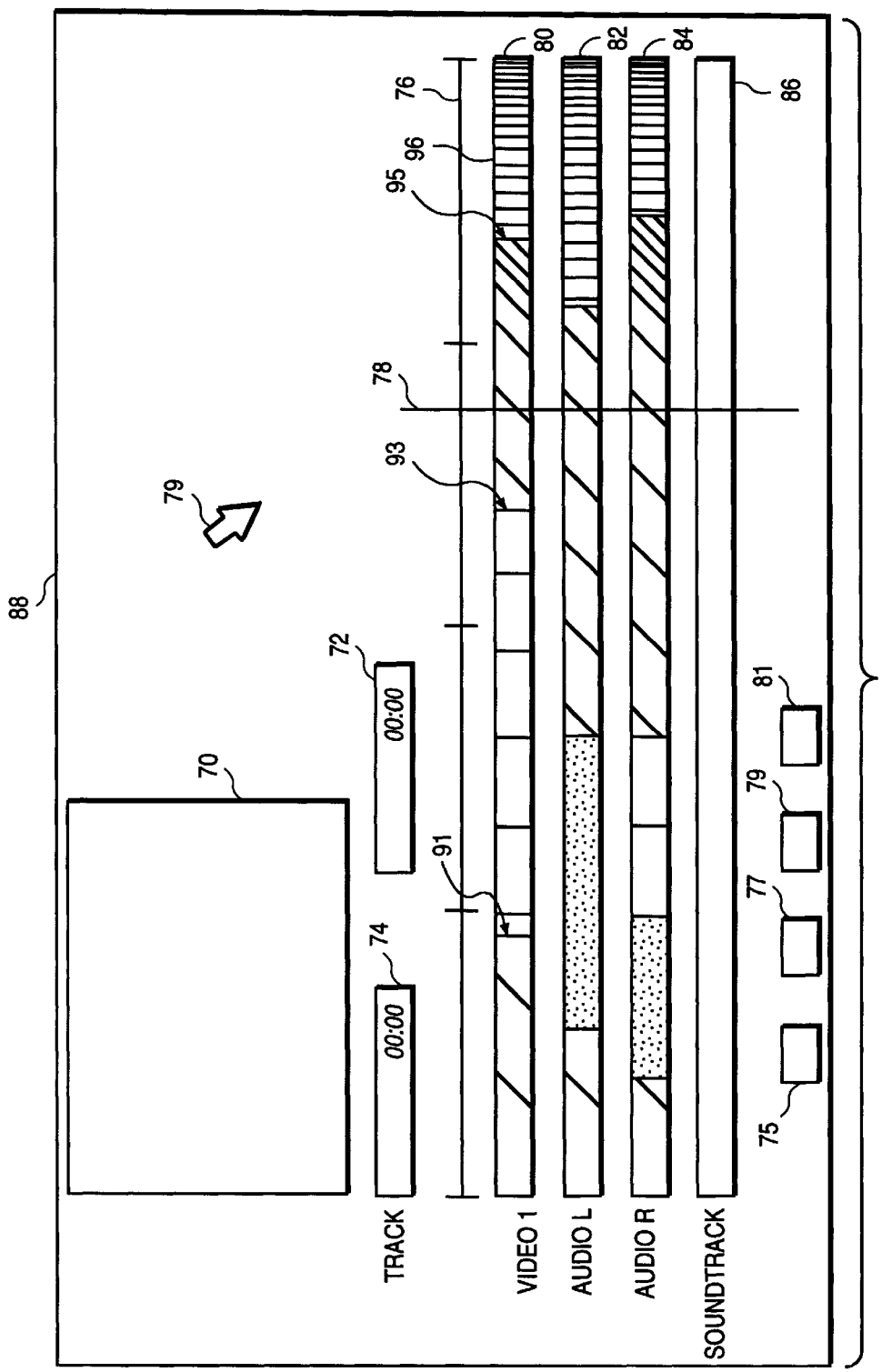
FIG. 2 illustrates a graphical user interface for a computer editing system configured in accordance with the present invention.

Referring to FIG. 2, a graphical user interface for a computer editing system configured in accordance with the present invention is illustrated. The graphical user interface 88 permits a user of the computer editing system to perform a number of re-editing functions. The graphical user interface 88 comprises a plurality of timelines 80, 82, 84 and 86 that each display any number of source blocks arranged in a sequence. For example, blocks 90 and 94 on timeline 80 may represent an interviewer and blocks 92 and 96 may represent the interviewer's subject. The blocks 90 and 92 are separated by a block indicator 91, the blocks 92 and 94 are separated by a block indicator 93 and the blocks 94 and 96 are separated by a block indicator 95.

As described above, during an earlier editing session, source blocks are placed on each timeline which represents a time position in a final output sequence. In a preferred embodiment, the timeline 80 represents video, the timeline 82 represents left audio, the timeline 84 represents right audio and the timeline 86 represents soundtrack. The timelines 80, 82, 84 and 86 are arranged in a horizontal direction beginning at the left and extending to the right. However, the timelines 80, 82, 84 and 86 may be arranged in a horizontal direction beginning at the right and extending to the left, or the timelines 80, 82, 84 and 86 may be arranged in a vertical direction.

In addition to the timelines 80, 82, 84 and 86, the graphical user interface 88 displays a timeline cursor 78 and a selection cursor 83. The timeline cursor 78 indicates the current position of the source material and extends vertically through the tracks and intersects a time bar 76, which indicates the time of the composite version that is being edited by the user. Time windows 72 and 74 provide a numeric display of the time of the composite version. The placement of the selection cursor 83 on the graphical user interface 88 is controlled by the cursor control device 52. The graphical user interface 88 permits selection of a number of re-edit functions 75, 77, 79 and 81.

To view video corresponding to selected source materials, the graphical user interface includes a display window 70. The graphical user interface may include more than one display screen and the interface may comprise a windows environment.

The present invention effectively conveys information to the user by selectively varying different components using color in the interface. Color, as perceived by the human eye, consists of three orthogonal components, hue, luminance and saturation. The hue is the dominant wavelength of the "color," the luminance is the intensity of the color and saturation is the vividness of a color. The human eye can distinguish colors where two of the three components are identical and the remaining third component varies.

In a preferred embodiment, the graphical user interface of the present invention varies the hue, saturation and luminance of different variables to convey information regarding those variables to a user. As illustrated in FIG. 2, different sources are represented by different hues where different hues in FIG. 2 are shown as different crosshatchings. A plurality of blocks on the timeline representing a first source such as an interviewer may be appear in one hue while the blocks on the timeline representing a second source such as the interviewer's subject may appear in a different hue. In addition, the source may be identified by text. In this manner, a user may easily distinguish between different sources.

Figure 8:
FIG. 8 is a color slide that illustrates the use of color components, in accordance with the teachings of the present invention.
Figure 9:
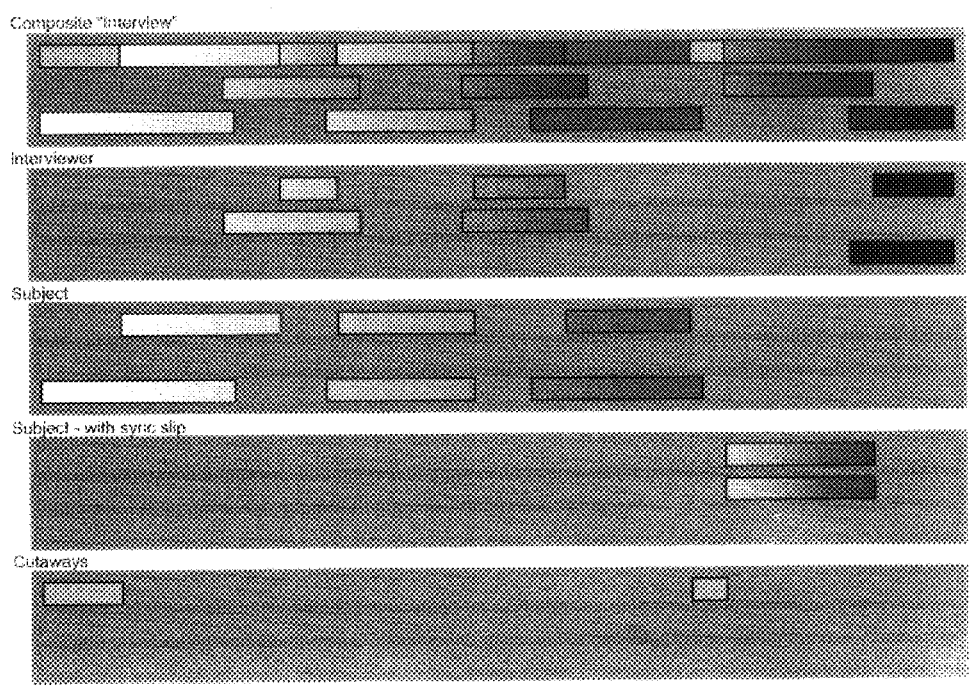
FIG. 9 is a color slide illustrating the use of color components with full shading and no text, in accordance with the teachings of the present invention.
Figure 10:
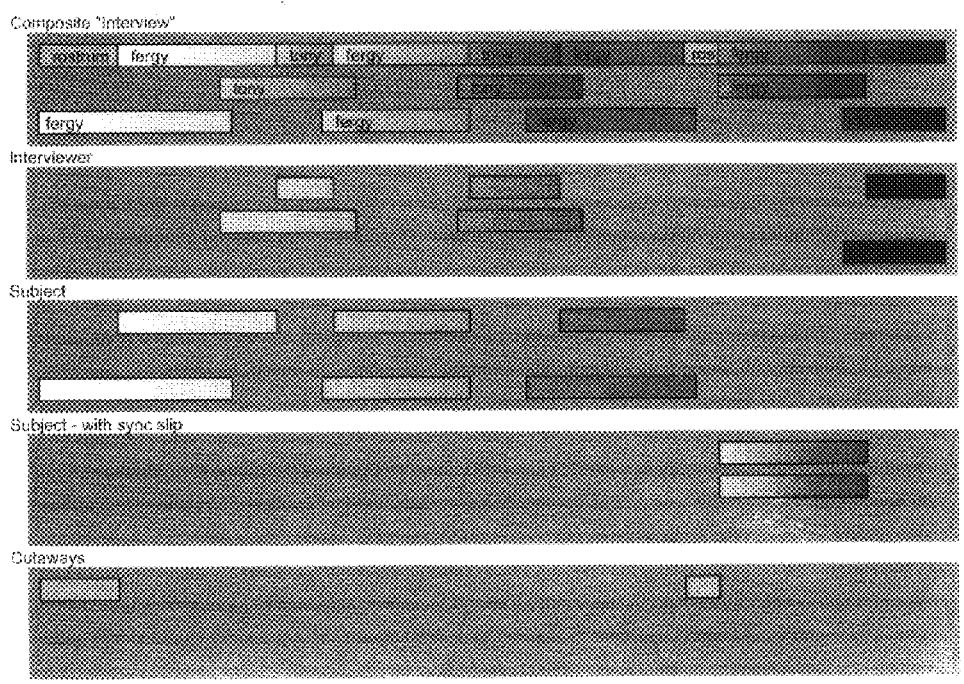
FIG. 10 is a color slide illustrating the use of color components with full shading and text, in accordance with the teachings of the present invention.
Figure 11:
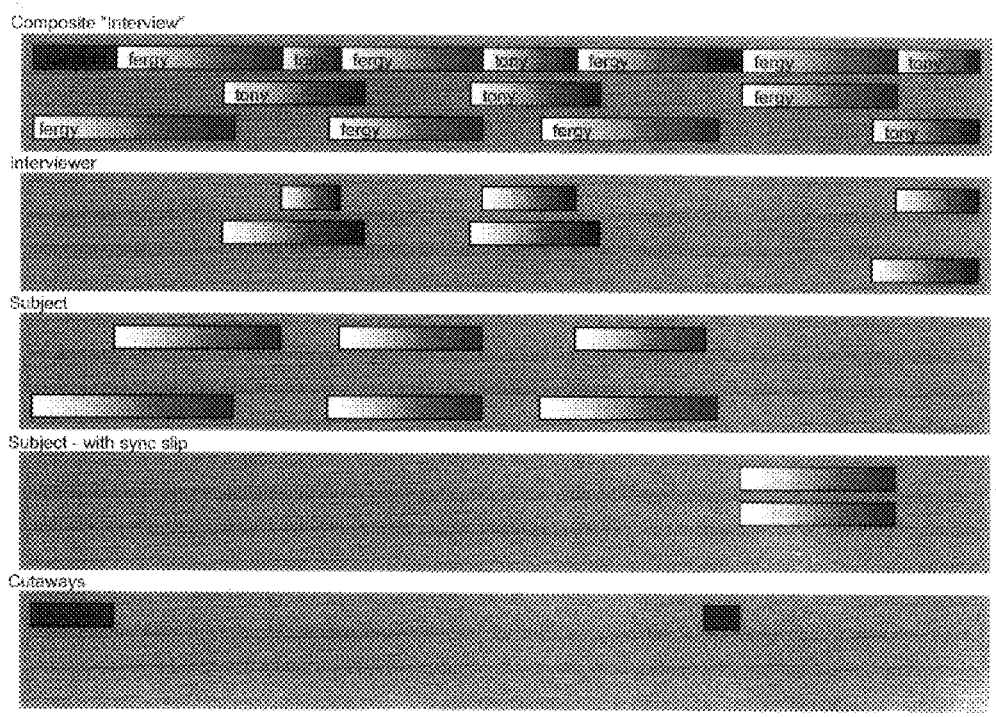
FIG. 11 is a color slide illustrating the use of color components with simple shading and text, in accordance with the teachings of the present invention.

Varying the lightness of the hue allows the interface to provide more information to the user. In a preferred embodiment, the lightness of a hue corresponding to a source is varied to represent the time of the source. As illustrated in FIG. 2, the timeline 76 varies continuously from a light shade at earlier times of the source to a darker shade at the later times of a source. In FIG. 2, and in FIGS. 3–6, the varying lightness is for each hue is shown as a gradient in the crosshatchings. The varying lightness allows a user to distinguish between earlier and later times of a source. The lightness may be inverted, with darker areas representing earlier time and lighter areas representing later time. FIG. 8 is an exemplary color slide illustrating the use of color components, in accordance with the teachings of the present invention. FIGS. 9 and 10 are color slides illustrating the use of color components with full shading. (FIG. 9 also illustrates the use of no text, while FIG. 10 illustrates the use of text.) FIG. 11 is a color slide illustrating the use of color components using simple shading.

Apart from hue and lightness, the eye perceives a third distinct component of "color," saturation, and the interface of the present invention also utilizes saturation to convey information to a user. A user may position the cursor 83 to select a particular block 92 for editing, and the selected block 92 may be distinguished from the other blocks 90, 94 and 96 by saturating the color of the selected block 92 relative to the saturation levels of the other blocks 90, 94 and 96. The user may select the desired hues to distinguish the different source materials.

Figure 3:
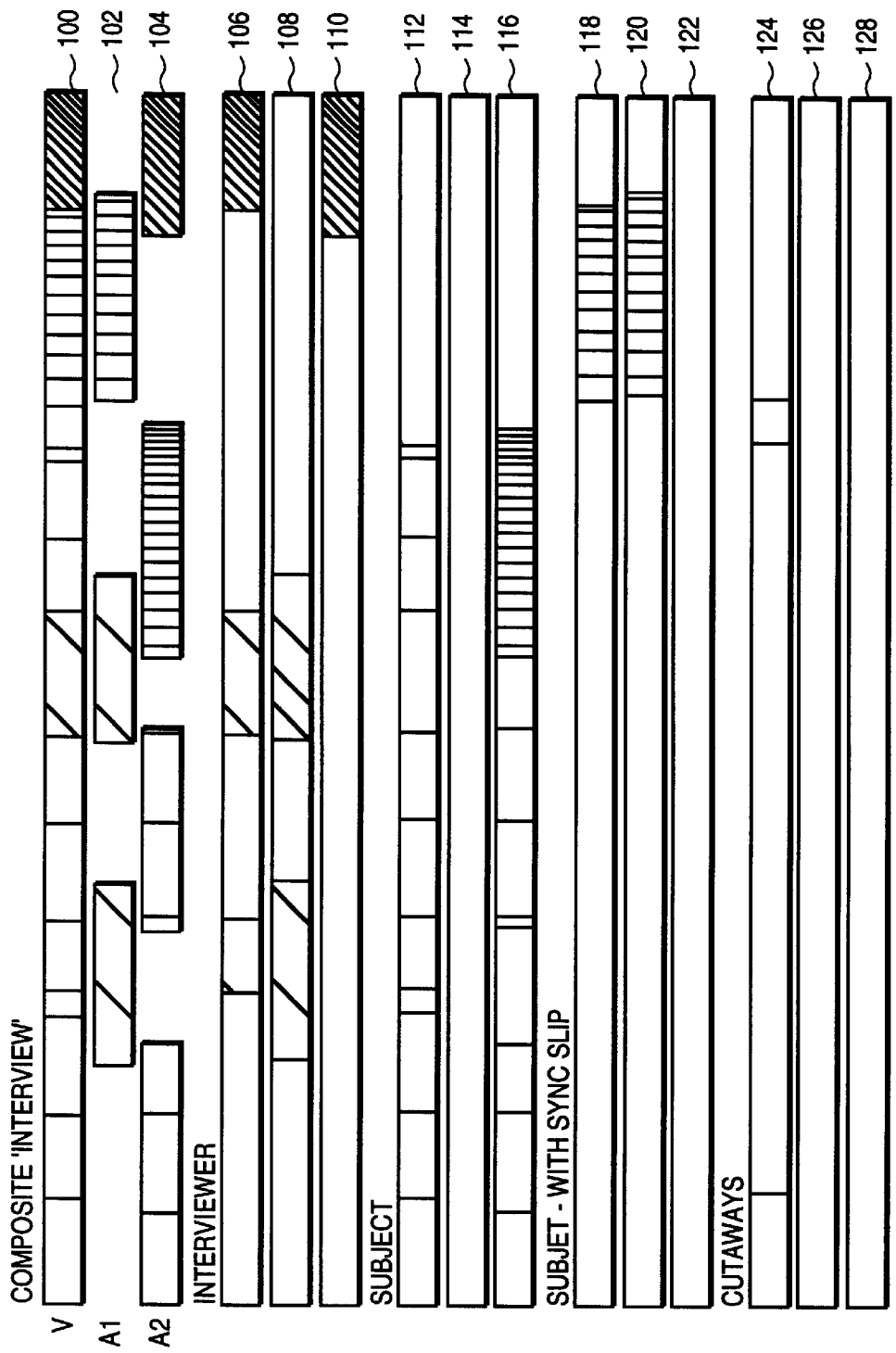
FIG. 3 shows a plurality of timelines that illustrate the use of lightness gradients to convey time information and hue to convey source information for an "Interview" comprising a "Subject" source and an "Interviewer" source.

FIG. 3 illustrates timelines where the components of color have been mapped to different variables in the context of an interview. As shown in FIG. 3, the composite interview tracks are illustrated by timelines 100, 102 and 104, where timeline 100 represents composite video, timeline 102 represents a first audio track and timeline 104 represents a second audio track. Timelines 106 and 108 represent the video and first audio tracks of the interviewer and include portions that are displayed a first hue while timelines 112 and 116 represent the video and second audio tracks of a second subject and include portions that are displayed a different hue.

The timelines 100, 102 and 104 comprising the composite interview contain source blocks related to the interviewer and the subject. The source blocks related to the interviewer and the source blocks related to the subject vary in lightness from darker to lighter to represent earlier to later times. In a preferred embodiment, the lightness between the different hues varies regularly such that the times of source blocks relative to the start times of the source may be readily recognized in adjoining blocks representing different sources.

Frequently, the relative time of the source materials does not correspond to the absolute time of the edited composite being assembled by the user. For example, different relative times of a source material may be simultaneous times on the composite version. To display "sync slip" of one track relative to another track, the rightmost part of the timeline 116 has a greater lightness than the part of the timeline 112 at the same point in the edited version. In other words, the audio represented by timeline 116 is matched in the edited version to video at an earlier point in the interview and this is conveyed to the user by displaying different values of lightness along a vertical line corresponding to the time of the edited version.

The timelines 118 and 120 represent the video and first audio tracks of the second subject with another kind of "sync slip" and include source blocks that are displayed in the same hue as that assigned to the subject. This kind of "sync slip" is "slip" of all source tracks relative to the program time or to previous uses of the same source and thus ensures that the video and audio sources are synchronized. Also, there may be "sync clip" of one track relative to another. The timeline 124 represents the video track of cutaways and is displayed in a hue distinct from those assigned to the interviewer and the subject.

Figure 4:
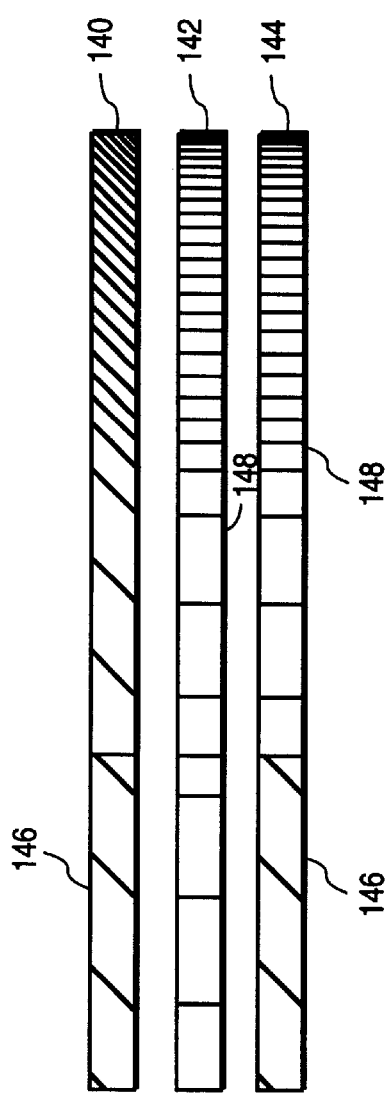
FIG. 4 shows three timelines that illustrate the use of gradients to convey speed information of the underlying source material corresponding to the timelines.
Figure 12:
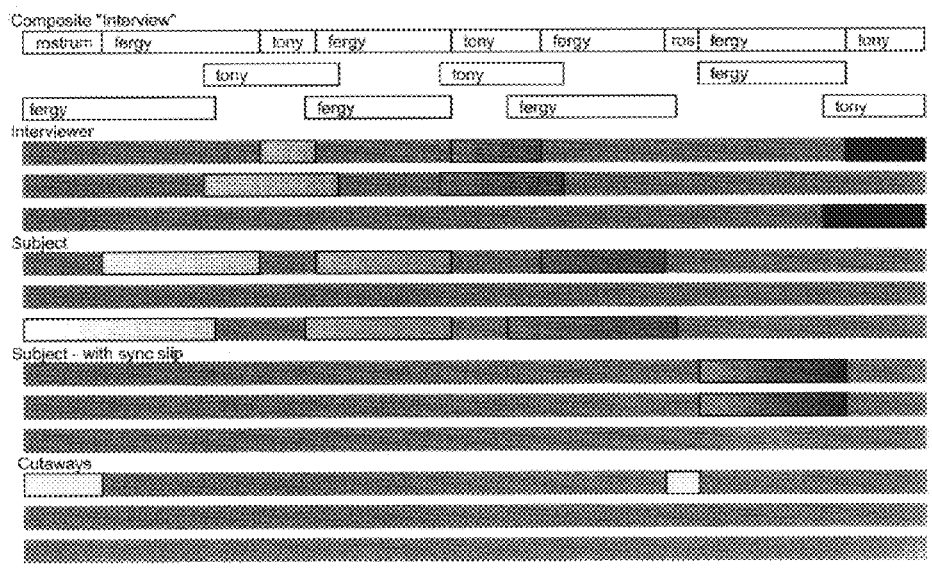
FIGS. 12 and 13 are color slides illustrating the use of color components with the use of lightness gradients, in accordance with the teachings of the present invention.
Figure 13:
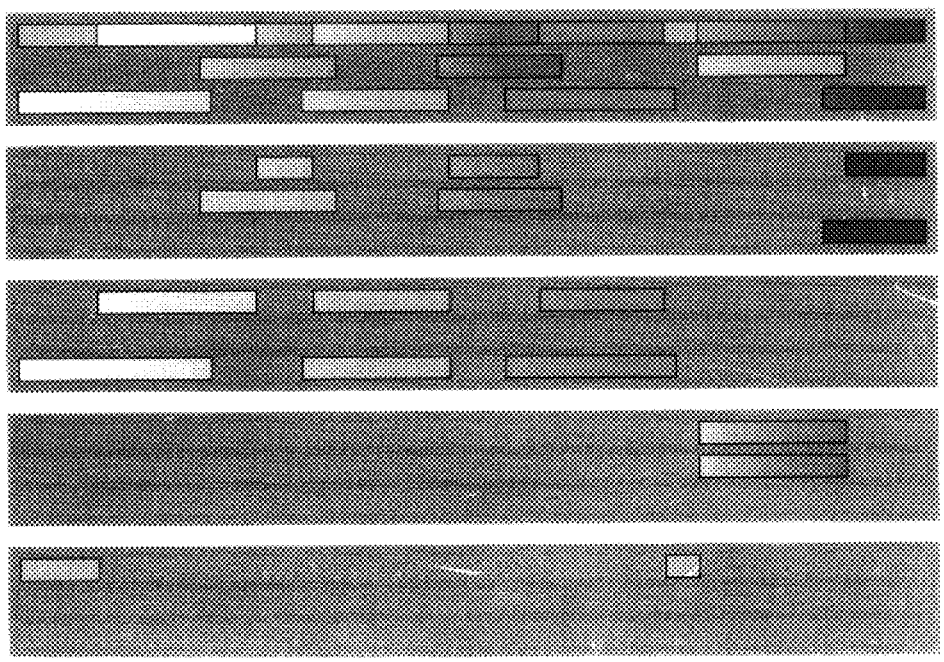

The three orthogonal components of color, hue, saturation and lightness, may be used to represent any type of variable, such as distance and speed. As illustrated in FIG. 4, two timelines 140 and 142 represent different source materials that are to be spliced together to form a slow motion scene for a movie or a multimedia presentation. The timeline 140 is displayed in a first hue and the timeline 142 is displayed in a second hue. The hues vary in lightness according to the speed of the source material. Thus, a user may form a composite timeline 144 comprising one block 146 of timeline 140 and one block 148 of timeline 142 where the composite timeline represents source material that varies smoothly according to speed. FIGS. 12 and 13 are color slides illustrating the use of color components with the use of lightness gradients, in accordance with the teachings of the present invention.

Figure 5:
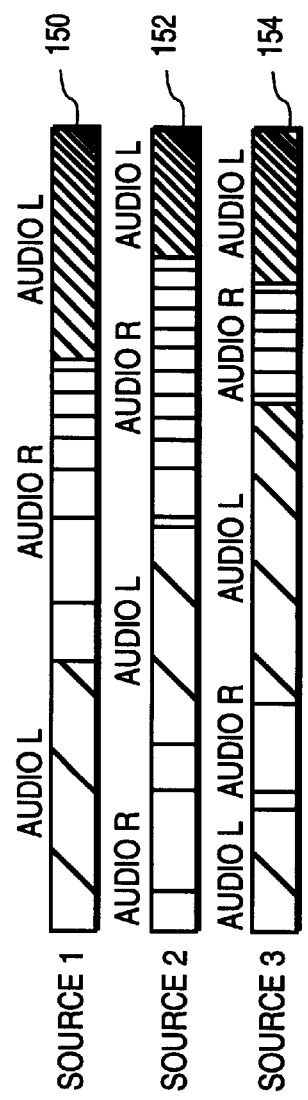
FIG. 5 illustrates an alternative embodiment of a user interface for a multi-media editor with sources listed vertically and tracks listed horizontally.

FIG. 5 illustrates an alternate embodiment of the present invention. As illustrated in the Figure, a plurality of sources are listed vertically and a plurality of timelines 150, 152 and 154 represent the tracks including the source related to the timeline. The different tracks may be distinguished by text and hue and, as before, lightness and saturation may be used to represent time and selection respectively. The embodiment illustrated in FIG. 5 may prove particularly useful for audio mixing.

In addition to representing any type of variable, any one of the components of color may represent more than one variable. For example, hues between red and orange may represent relative volume of a first audio track and hues between blue and violet may represent the bass level a second audio track.

Further, any of the three components of color may be varied continuously or may only represent discrete values. As illustrated in FIG. 2, lightness is varied continuously while hue and saturation have discrete values. However, the lightness may be used to represent discrete values while hue and luminance may represent a continuum of values.

For continuous variables, the color component may be mapped to the variable by calibrating the values of the end points of the variables to the desired color at those values. For example, if lightness represents time, and time varies from 0:00 hours to 5:00 hours, the desired minimum lightness value may be mapped to 0:00 hours and the desired maximum lightness value may be mapped to 5:00 hours. The lightness may vary linearly between the end points to represent times between 0:00 hours and 5:00 hours, or alternatively, a logarithmic or other type of mapping may be used. A logarithmic mapping may be particularly appropriate when a variable that may have an infinite value is to be mapped. In the preferred embodiment, distinct blocks are identified and the appropriate lightness gradation for the block is assigned by a desired mapping.

Figure 7A:
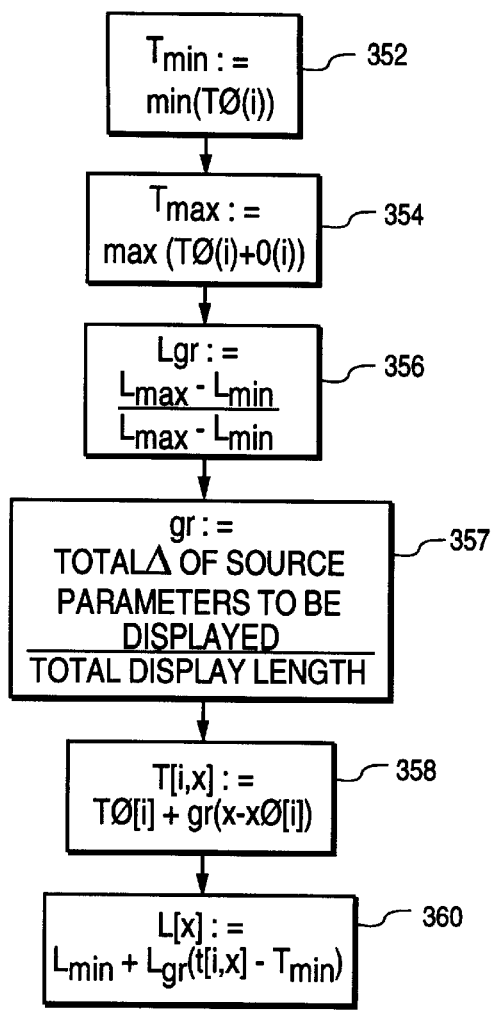
FIG. 7a is a flow chart for one embodiment of the present invention for a continuous mapping of a variable to a color component and displaying the color component.
Figure 7B:
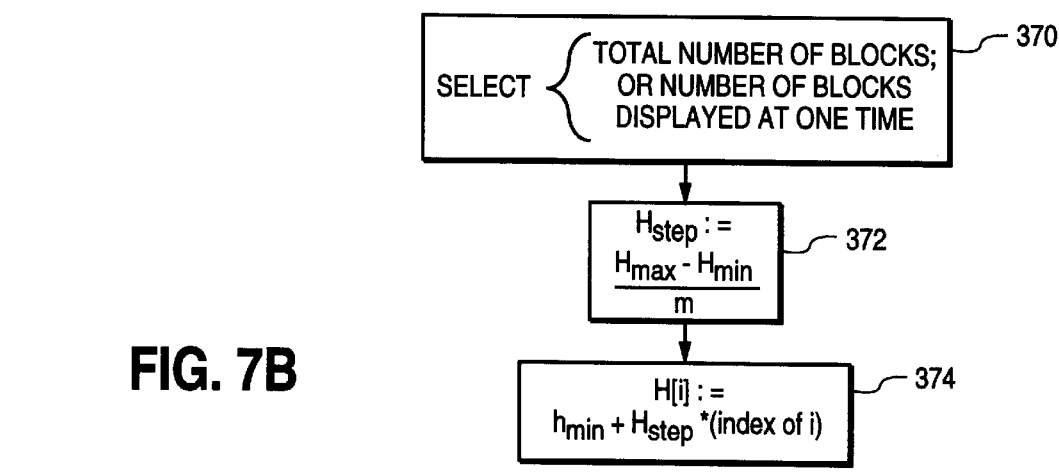
FIG. 7b is a flow chart for one embodiment of the present invention for a discrete mapping of a variable to a color component and displaying the color component.
Figure 7C:
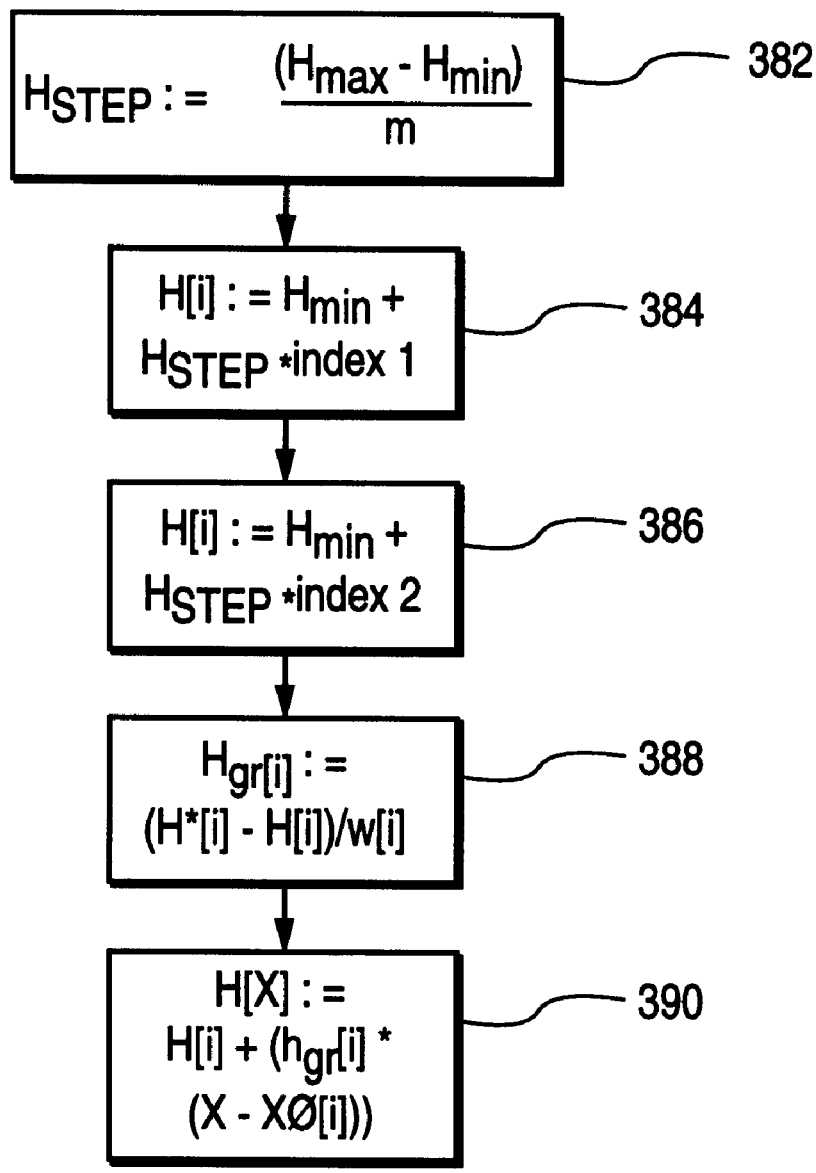
FIG. 7c is a flow chart for one embodiment of the present invention for a combination of discrete and continuous mapping of a variable to a color component and displaying the color component.

FIGS. 7a–7c are flow charts of alternate methods for mapping a variable to a color component and displaying the color component. According to the notation of the flow charts, it is assumed that there are a set of n source blocks $\{1,2,3 \ldots n\}$ and only a subset of the total set will be displayed at any one time which is denoted by $\{i1,i2, \ldots ik\}$ or $\{i\}$ for short. There are k items in the set $\{i\}$ where k<n.

The starting position in the display of each block in the set $\{i\}$ is represented as $X_0[i]$, which, in the interface of FIG. 2, corresponds to a relative time. The initial value for each block of the variable that is being mapped is represented as $T_0[i]$ and $D[i]$ represents the change in that variable over the block. For example, $T_0[i]$ is the variable time and $D[i]$ is the time duration of a block in FIG. 2 but the data being mapped may comprise any type of variable.

FIG. 7a is a flow chart for a continuous mapping of a variable to a color component and displaying the color component. As shown in block 352, the minimum value of the variable being mapped is the smallest of the initial value of the variable for each block. As shown in block 354, the maximum value of the variable being mapped is the greatest of the final values, represented by the initial value plus the duration, of the variable for each block. $T_{min}$ and $T_{max}$ may be calculated over the complete set of known sources, to provide a "rolling" gradient of lightness, or be calculated over only the displayed subset $\{k\}$, to provide a "static" gradient of lightness.

As shown in block 356, for a linear mapping, the gradient is the change in color component divided by the change in variable value where $L_{max}$ represents the maximum desired color component value and $L_{min}$ represents the minimum desired color component value. $T_{max}$ and $T_{min}$ are found by taking the mininum and maximum values of the variable over all of the blocks.

To display the color component, it must be mapped to display locations. To map the color component to display locations, a translation must be made from the screen position to the variable. At block 357, the total change in the variable being displayed, for example time, is divided by the total display length. At block 358, the variable value as a function of distance is then:

$$t[i,x]=T_0[i]+gr*(x-X_0[i]), x \text{ in range}:\{X_0[i], X_0[i]+W[i]\};$$

where x is a variable representing position on the display, gr is the scaling from position to time (in units of time/distance) and W[i] is the displayed width of the block i. As previously described, the total time elapsed during block i is represented by D[i], where D[i]=gr*W[i]. Gr is a scalar value and, since it is the mapping from distance to time, is used for each displayed block. Thus, as shown in block 360, the lightness L[x] at a particular position x on the display is then:

$$L[x]=L_{min}+L_{gr}*(t[i,x]-T_{min}).$$

This lightness assignment works best when using high resolution screens such as 16 or 24 bit color displays.

An alternate method may be preferable for displays with lower resolutions such as 8 or 16 bit displays, or when displaying a finite set of discrete values, or when the underlying display system (computer operating system) is going to use color dithering to render colors. FIG. 7b is a flow chart for an alternate embodiment that implements a discrete mapping of a variable to a color component. According to this alternate method, a variable N[i] is assumed to take on one of a finite number of discrete values and keeps a single value throughout a particular block.

As shown in block 370 of FIG. 7b, the gradient may calculated over the total number of blocks for a source or the number of blocks being displayed at one particular time, depending upon whether a "rolling" or "static" gradient is desired, as previously described. The set of blocks over which the gradient is taken is ordered in a set N[unique] of the unique values represented by those blocks with the ordering from blocks with smaller to greater variable values. As shown in block 372, to determine the change in a color component, for example hue, from a block to the next block, the overall difference in hue is divided m, which is the number of elements in N[unique]:

$$H\text{step}=(H_{max}-H_{min})/m.$$

where $H_{max}$ and $H_{min}$ are the desired maximum and minimum hues respectively. The hue for a particular block is then calculated as shown in block 374. The hue H[i] for each block i is:

$$H[i]=H_{min}+H_{step}*\text{index of } i;$$

where the index of i is the the ordering of the block i in N[unique]. For example, a fifth block (i=5) may actually be the block with the least value in which case the index of i value would be 0 whereas if it had the second least value the index of i value would be 1.

A third mapping method provides improved emphasis of the edges between elements, at the expense of direct algebraic mapping. This method is a combination of the two previously described methods as shown in FIGS. 7a and 7b and is effective with higher resolution displays. According to this method, unique ranges of a variable are evaluated and mapped into unique ranges of a color component, hue, saturation or luminance.

As previously described, a "rolling" or "static" gradient may be effecting depending upon the choice of blocks over which to calculate the gradient. As shown in block 382 of FIG. 7c, the difference between an end point of a block and the start of the next block, or the start of a block to the end of the same block, is calculated as:

$$H_{step}=(H_{max}-H_{min})/m;$$

where m is equal to the number of values in the set T[unique] where T[unique] is the conjunction of the sets defined by the unique values of the variables at the start and end points of each block and T[unique] is ordered from least values to greatest values.

Next, different hue values may be calculated for the start point and end point of each block as shown in blocks 384 and 386:

$$H[i]=H_{min}+H_{step}*(\text{index 1});$$

$$H'[i]=H_{min}+H_{step}*(\text{index 2});$$

where H[i] is the value at the start of each block and H'[i] is the value at the end of each block, index 1 is the ordering of H[i] in the ordered set T[unique] and index 2 is the ordering of H'[i] in the ordered set T[unique]. As shown in block 388, for each block, the gradient $H_{gr}[i]$ is:

$$H_{gr}[i]=(H'[i]-H[i])/W[i];$$

where W[i] is the display width of the block, as previously described. Finally, as shown in block 390, for each block i, the hue H[x] at a particular location is:

$$H[x]=H[i]+Hgr[i]*(X-X_0[i]);$$

where $X_0$ is the starting display position of the block, as previously described.

In an alternate embodiment of the method illustrated in FIG. 7c, the gradient may be adjusted by calculating the value:

$$H_{step}=(H_{max}-H_{min})/(2*m+e);$$

and substituting this value for $H_{step}$ in block 382. According to this alternate embodiment of FIG. 7c, the hue for an end point of a block would then be:

$$H'[i]=H_{min}+H_{step}*((2*i+1)+e);$$

and block 386 would be adjusted accordingly. This method may be extended to further emphasize the discontinuities between elements by increasing the value of m and inserting "dummy blocks" into the calculation, where the dummy blocks are never displayed. Displayed blocks that are separated by a "dummy block" will have a greater difference in hue since the intervening hues are mapped to the dummy block.

As previously described, a color component may represent more than one variable and the mappings must be appropriately calibrated. For example, hues between red and orange may represent relative volume of an audio track from a first source and hues between blue and violet may represent relative volume of an audio track from a second source. In this example, red may be assigned to the minimum volume and orange assigned to the maximum volume for the first source while blue is assigned to the minimum volume and violet assigned to maximum volume for the second source. Thus, for volume, the hue may vary continuously between red and orange for the first source and may vary continuously between blue and violet for the second source.

Figure 6:
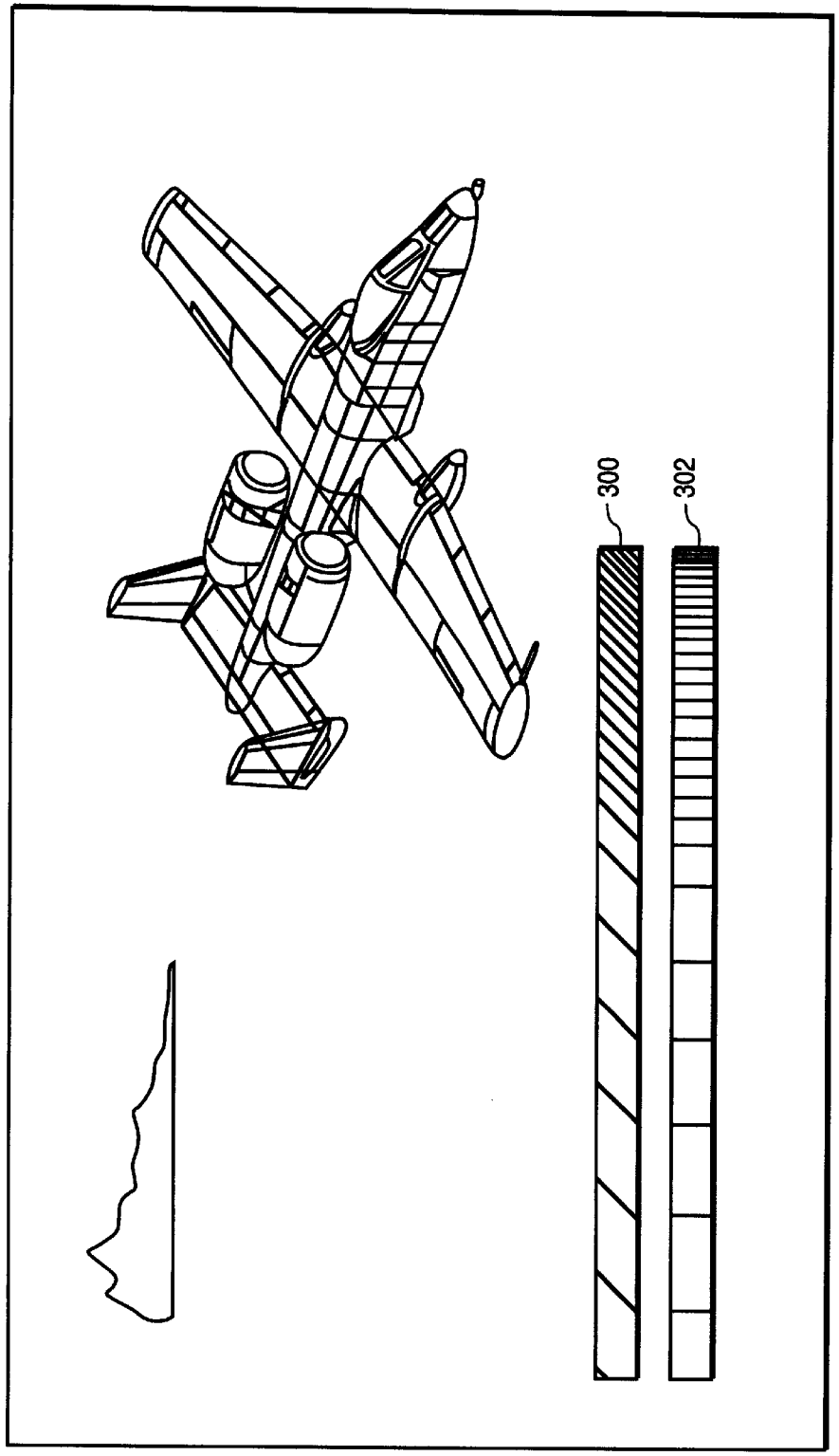
FIG. 6 illustrates a user interface embodying the teachings of the present invention in the context of a computer game.

The present invention is not limited to a screen editor, and the three orthogonal components of color may be used to convey information in any type of interface. By way of example, FIG. 6 illustrates a user interface for a multimedia flight simulator. A plurality of bars indicates available ammunition where a red bar may represent bombs and a blue bar represents guided missiles. A plurality of indicators 300 and 302 show the availability of ammunition and the bars vary in lightness according to available ammunition. The user may efficiently select an amount of ammunition by placing a cursor at an area of a bar.

Although the present invention has been described in terms of a preferred embodiment and with reference to FIGS. 1–7, it will be appreciated that various modifications and alterations might be made by those skilled in the art without departing from the spirit and scope of the invention. The invention should therefore be measured in terms of the claims which follow.

I claim:

1. A computer controlled editing system for editing a multi-media production including a central processing unit (CPU) coupled to a display device and storage means coupled to said CPU, an apparatus for displaying available source material for editing including:

storing means for storing a plurality of source logs corresponding to blocks of source materials for editing by said computer controlled editing system; and display means for displaying, on said display device, a timeline, wherein at least a section of one block corresponding to said source logs is manifested by a variable mapped to a component of color along at least a portion of said timeline, and said component of color varies continuously and gradually along the timeline as the value of said variable varies with time along the timeline.

2. The apparatus of claim 1 wherein said portion of said timeline varies by luminance.

3. The apparatus of claim 1 wherein said portion of said timeline varies by hue.

4. The apparatus of claim 1 wherein said portion of said timeline varies by saturation.

5. The apparatus of claim 1 wherein said timeline varies smoothly by a component of color.

6. The apparatus of claim 1 wherein:

said timeline includes blocks representing different source materials, said different source materials each being represented by a different hue; and said timeline varies by luminance, said varying luminance corresponding to varying time.

7. The apparatus of claim 6 further including:

selecting means for selecting one of said blocks for editing; and means for displaying said selected block as saturated at a different level than at least one other block.

8. The apparatus of claim 6 further including means for displaying a plurality of timelines, including at least one timeline that represents video, one timeline that represents left audio and one timeline that represents right audio.

9. The apparatus of claim 8 wherein said timelines are displayed as bars.

10. The apparatus of claim 9 wherein said bars are displayed horizontally.

11. The apparatus of claim 1 wherein:

said timeline represents video; and said varying component of color of said timeline corresponds to varying speed.

12. The apparatus of claim 11 wherein said timeline varies by luminance such that greater luminance corresponds to a greater speed and a lesser luminance corresponds to a lesser speed.

13. A computer controlled editing system for editing a multi-media production, the system comprising:

a storage device to store a plurality of source logs corresponding to blocks of source material for editing by the computer controlled editing system; and a graphics display device coupled to the storage device to display a timeline, such that a section of a selected block of source material is mapped to a color component along a portion of the timeline, the section of the selected block of source material is manifested by a variable which is mapped to the color component along the portion of the timeline, and the color component varies continuously and gradually along the timeline as the variable varies with time along the timeline.

14. The system of claim 13, further comprising:

a central processing unit (CPU) coupled to the storage device and the graphics display device to execute a software process to edit the source logs and to display the timeline.

15. The system of claim 13, wherein the portion of the timeline varies by luminance.

16. The system of claim 13, wherein the portion of the timeline varies by hue.

17. The system of claim 13, wherein the portion of the timeline varies by saturation.

18. The system of claim 13, wherein:

the timeline includes blocks of different source material, each of the blocks of different source material representing a different hue value; and the timeline varies by luminance corresponding to a varying time.

19. A method for displaying and editing source material corresponding to a multimedia production, the method comprising:

storing a plurality of source logs corresponding to blocks of source material for editing by a computer controlled editing system; and displaying a timeline on a display device, such that a section of a selected block of source material is mapped to a color component along a portion of a timeline, wherein the section of the selected block of source material is manifested by a variable which is mapped to the color component along the portion of the timeline, and the color component varies continuously and gradually along the timeline as the variable varies with time along the timeline.

20. The method of claim 19, wherein displaying the timeline on the display device further comprising:

varying the portion of the timeline in accordance with changes in a luminance value.

21. The method of claim 19, wherein displaying the timeline on the display device further comprising:

varying the portion of the timeline in accordance with changes in a hue value.

22. The method of claim 19, wherein displaying the timeline on the display device further comprising:

varying the portion of the timeline in accordance with changes in a saturation value.

23. The method of claim 19, wherein displaying the timeline on the display device further comprising:

varying the timeline in accordance with blocks of different source material, each of the blocks of different source material representing a different hue value; and varying the timeline in accordance with changes in a luminance value over time.

24. The method of claim 19 wherein displaying the timeline on the display device further comprising:

displaying the timeline as horizontal bars.

25. The method of claim 19, further comprising:

selecting one of the blocks of source material for editing; and displaying a selected block of source material at a different level of saturation than at least one other block of source material.

26. A computer program embodied on a computer-readable medium, comprising:

a first software component to store on a storage device a plurality of source logs corresponding to blocks of source material representing a multimedia production; and a second software component to display a timeline on a graphics display device, such that a section of a selected block of source material is mapped to a color component along a portion of the timeline, the section of the selected block of source material is manifested by a variable which is mapped to the color component along the portion of the timeline, and the color component varies continuously and gradually along the timeline as the variable varies with time along the timeline.

* * * * *